Oct. 24, 1933.　　　　C. L. FITZ　　　　1,931,983
CAMERA
Filed April 28, 1932　　　4 Sheets-Sheet 2
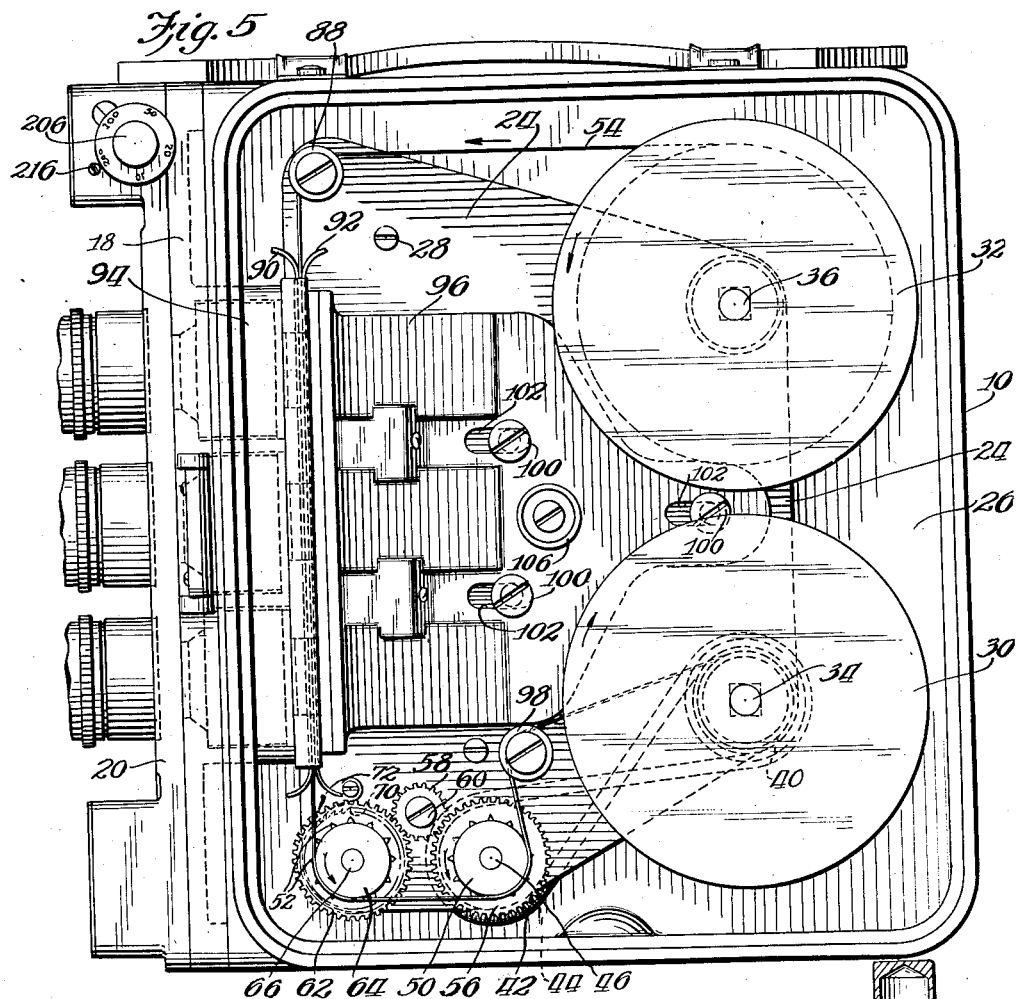
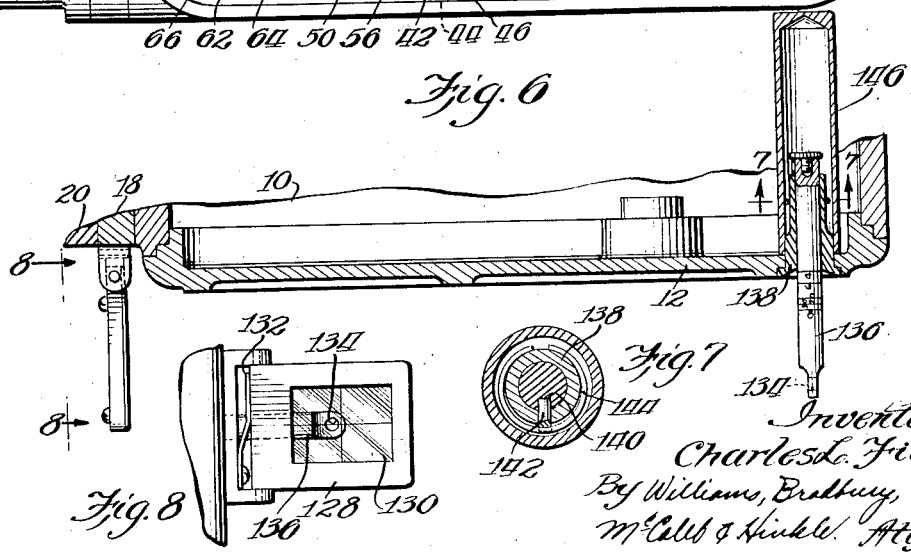

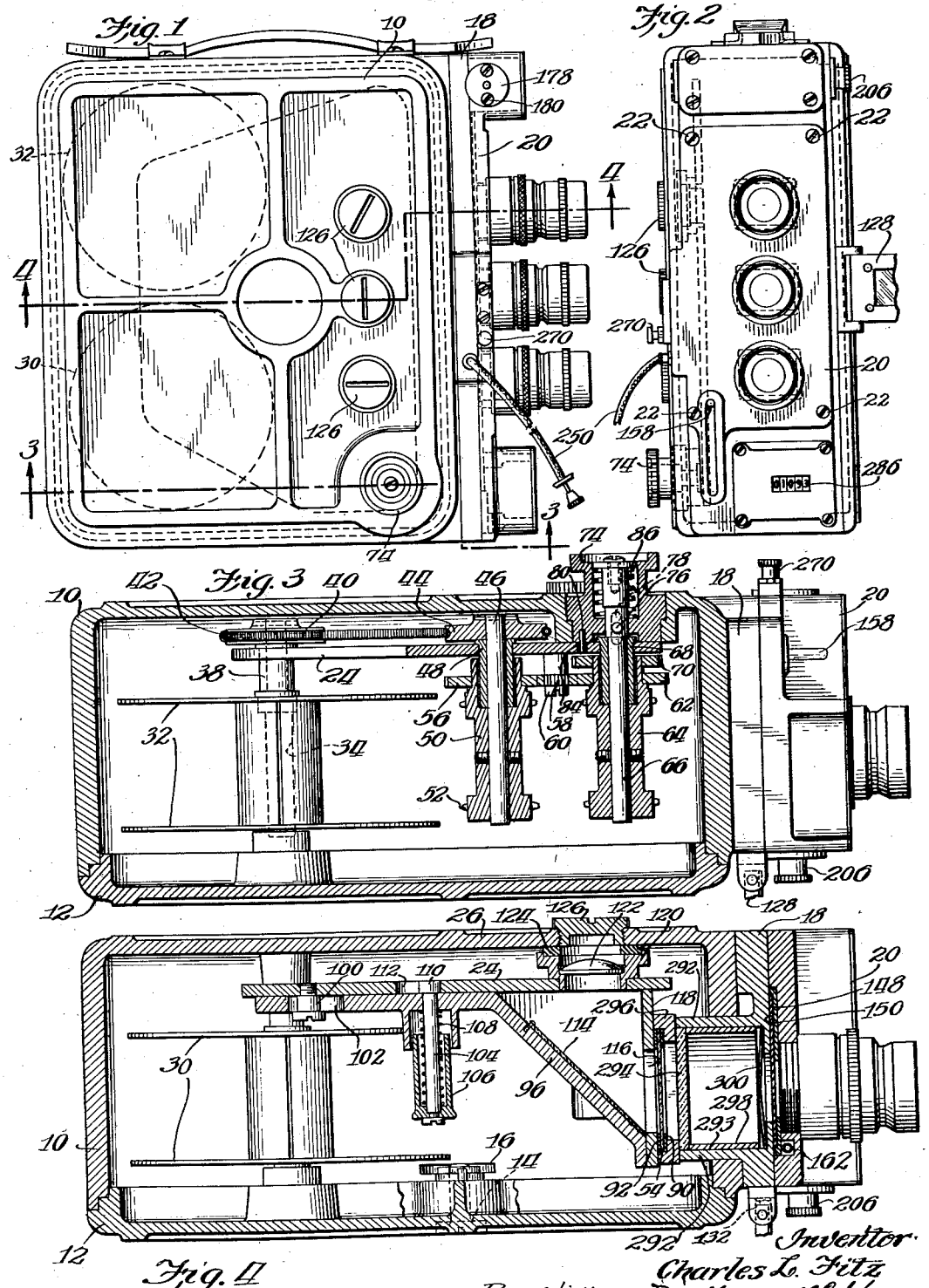
Oct. 24, 1933.    C. L. FITZ    1,931,983
CAMERA
Filed April 28, 1932    4 Sheets-Sheet 1
Inventor
Charles L. Fitz
By Williams, Bradbury, McCaleb & Hinkle
Attys.

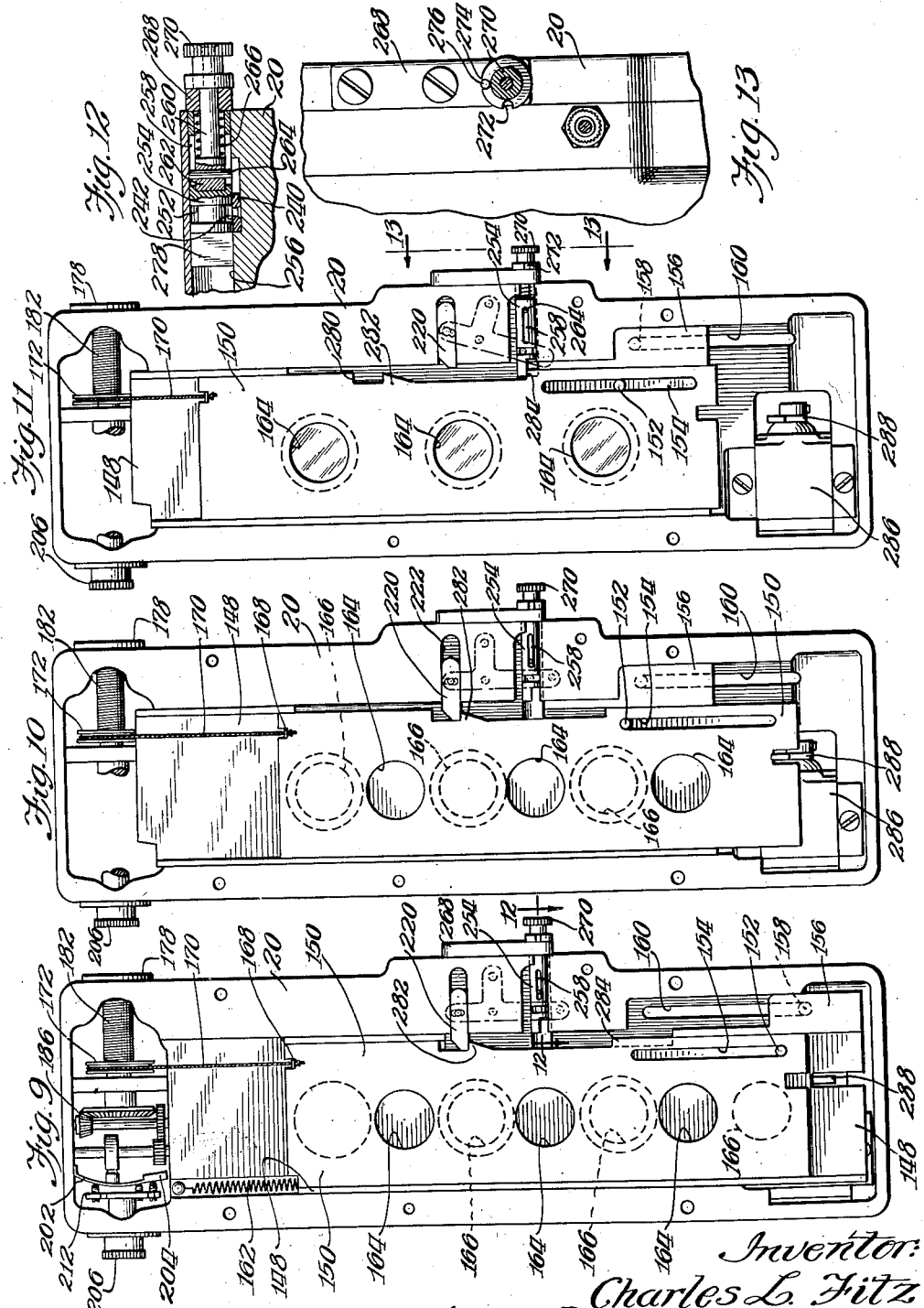

Oct. 24, 1933.    C. L. FITZ    1,931,983
CAMERA
Filed April 28, 1932    4 Sheets-Sheet 4
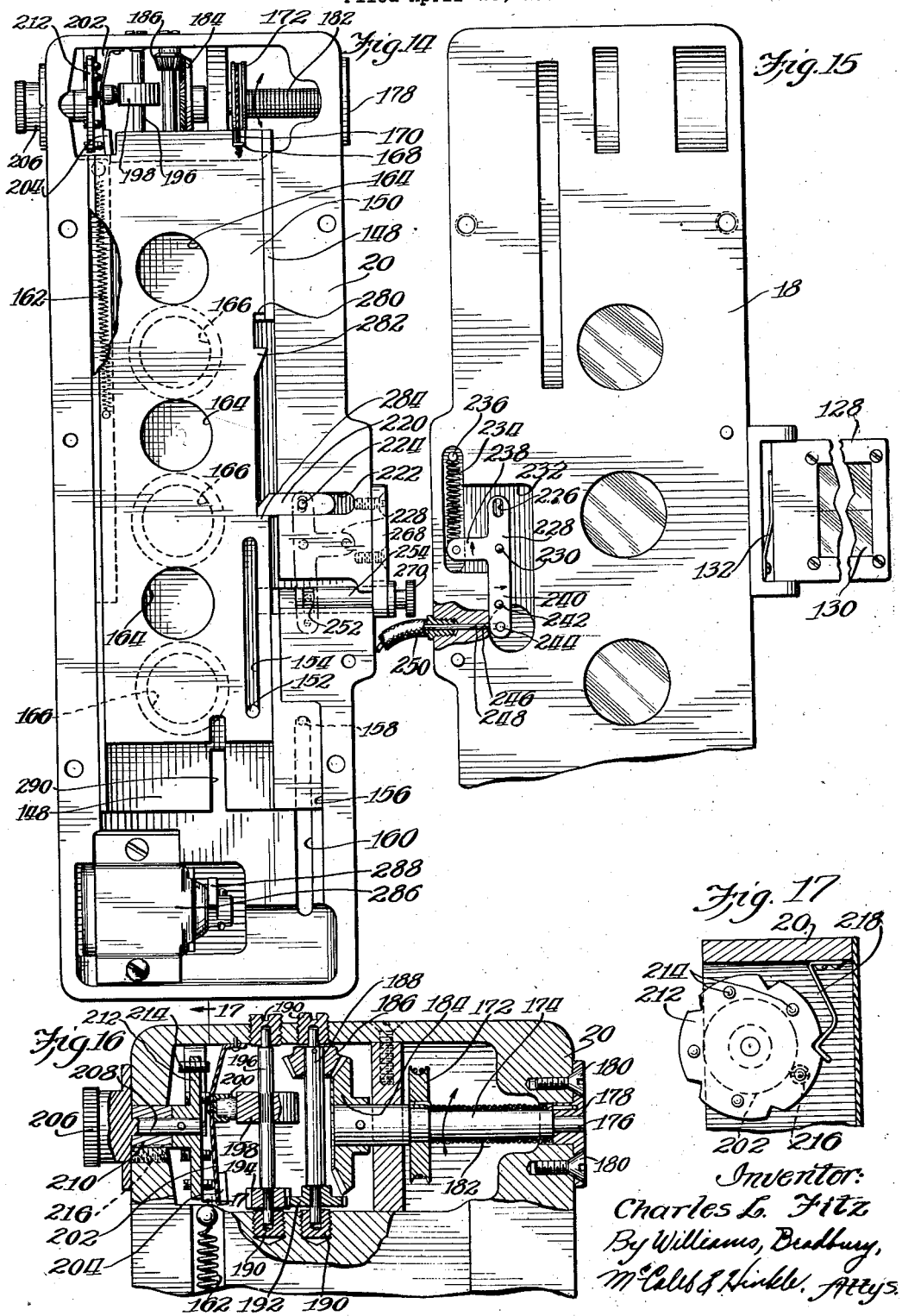
Inventor:
Charles L. Fitz
By Williams, Bradbury,
McCabe & Hinkle, Attys.

Patented Oct. 24, 1933

1,931,983

UNITED STATES PATENT OFFICE 1,931,983

CAMERA

Charles L. Fitz, Chicago, Ill.

Application April 28, 1932. Serial No. 607,921

8 Claims. (Cl. 95—2)

My invention relates generally to cameras, and more particularly to film cameras for three-color photography.

It is an object of my invention to provide a three-color camera of improved construction in which means are provided for the simultaneous and equal exposure of three spaced portions of a film.

A further object is to provide an improved shutter mechanism for three-color and similar cameras.

A further object is to provide an improved shutter timing mechanism.

Another object of the invention is to provide a film feeding mechanism for cameras.

A further object is to provide a camera which is simple in construction, may be easily operated, and may be economically manufactured.

Other objects will appear from the following description, reference being had to the accompanying drawings in which:

Figure 1 is a right side elevation of my improved three-color camera;

Figure 2 is a front elevation thereof;

Figure 3 is a horizontal sectional view thereof, taken on the line 3—3 of Figure 1;

Figure 4 is a similar sectional view, taken on the line 4—4 of Figure 1;

Figure 5 is a side elevation of the camera with the cover removed;

Figure 6 is a fragmentary horizontal sectional view showing the view finder;

Figure 7 is a sectional view, taken on the line 7—7 of Figure 6;

Figure 8 is a front view of the view finder looking in the direction of the arrows 8—8 of Figure 6;

Figure 9 is a front elevational view of the shutter mechanism in cocked position;

Figure 10 is a similar view, showing the shutter mechanism adjusted for a fractional second exposure;

Figure 11 is a view similar to Figure 9, showing the parts of the shutter mechanism in the positions they assume during a time exposure;

Figure 12 is a fragmentary sectional view of the time exposure adjusting means, taken on the line 12—12 of Figure 9;

Figure 13 is a fragmentary sectional view taken on the line 13—13 of Figure 11;

Figure 14 is a view similar to Figure 9, showing the shutter mechanism parts in the positions assumed after exposure has been completed;

Figure 15 is a fragmentary view showing particularly the shutter release mechanism;

Figure 16 is an enlarged sectional view of the shutter timing mechanism, and

Figure 17 is a vertical sectional view, taken on the line 17—17 of Figure 16.

General construction

As best shown in Figs. 1 to 5, the camera of my invention comprises, generally, a box or housing 10 having a cover 12 which may be secured thereto by any suitable means, such as a plurality of rotatable locking bolts 14 (Fig. 4), which are rotatably mounted in the cover and are adapted to engage in slots or grooves 16 formed in the housing 10. The locking bolts 14 are preferably provided with a kerf, so that they will not be inadvertently rotated but can be operated only by the insertion of a suitable key or by means of a coin. The housing 10 and its cover are preferably made of suitable light metal die castings and are provided with the usual reinforcing ribs, a double rabbet joint being formed so as to preclude the possibility of the admission of light to the housing. A front plate 18 and a lens carrying plate 20 are secured to the front wall of the camera by screws 22, these plates likewise preferably being die castings.

Film feeding mechanism

A plate 24 is rigidly secured to the side wall 26 of housing 10 by means of screws 28 which are threaded in bosses formed in the side wall 26 of the housing, the plate being spaced therefrom, as shown in Fig. 3. This plate serves as a support for the film feeding mechanism, which comprises a pair of reels 30, 32, mounted upon spindles 34 and 36, respectively. The spindle 36 is mounted for free rotation, except for a slight frictional drag which may be placed upon it by any suitable means, such as a friction washer. The spindles are mounted for rotation in flanged bushings 38, which may be secured to or formed integrally with the plate 24. The spindle 34 has a pulley 40 secured at its inner end for engagement by a coil spring belt 42, which is crossed, as indicated in dotted lines in Fig. 5, and winds about a pulley 44 secured to a shaft 46. The shaft 46 is rotatably mounted in a bushing 48 secured to the plate 24. A double sprocket 50, having teeth 52 for engagement in the apertures of a film 54, is non-rotatably secured to the shaft 46 and has a gear 56 secured thereto. An idler pinion 58, mounted for free rotation upon a stud 60, connects gear 56 with a similar gear 62 secured to a double sprocket 64. The double sprocket 64 is secured to a shaft 66, rotatably mounted in a bushing 68 carried by the plate 24. The double sprocket 64 also carries a ratchet wheel 70, which is arranged to be engaged by a spring-pressed pawl 72 to prevent rotation of the sprockets in the wrong direction. A knob 74 is non-rotatably secured to the shaft 66 by means of a pin 76, which is rigidly secured in the shaft 66 and the ends of which fit into slots 78 formed in the knob 74. The knob has a pin 80, which is adapted to engage in a hole 84 formed in the plate 24. A spring 86 normally presses the knob inwardly. The knob may be pulled outwardly, compressing the spring 86 and withdrawing the pin 80 from the hole 84, whereupon the knob may be rotated through one revolution. As best shown in Fig. 5, the film is fed from the reel 32 around a flanged guide roller 88 and between a guide 90 and a guide and presser plate 92, the former being rigidly secured to a projecting portion 94 of the housing casting 10 and the latter being resiliently secured to a slide 96. Suitable springs and guide pins are provided for the film guide 92 so as to press the film smoothly against the guide 90. The guides 90 and 92 have registering apertures. It will be noted that these apertures are spaced distances substantially equal to their vertical dimensions. It will thus be apparent that the three exposures will be made on alternate spaces of the film. The film feeds downwardly between the guides 90 and 92 around sprockets 64 and 50 and about a flanged idler roller 98, and thence upon the reel 30. The slide 96 is mounted for horizontal (Fig. 5) sliding movement on the plate 24, being carried by a plurality of shouldered cap screws 100, which project through slots 102 formed in the plate. Means are provided for locking the slide in the normal position, as shown in Fig. 5, said means comprising a headed pin 104 (Fig. 4), which has a cap 106 secured thereto. A spring 108 normally holds the pin in the position shown in Fig. 5, in which the head 110 of the pin rests in the circular portion of a keyhole slot 112. By pushing upon the cap 106, the head 110 of the pin 104 may be moved inwardly, so as to clear the plate 24, whereupon the slide 96 may be moved rearwardly.

*Focusing mechanism and view finder*

The slide 96 has three mirrors 114 (Fig. 4) secured thereto on the plane of rectangular apertures 116 formed in a front plate 118, which is rigidly secured to the slide 96. The three apertures 116 are, of course, in register with the corresponding apertures in the guide plate 90 and presser plate 92. The plate 24 has three bushings 120 secured therein, said bushings each carrying a lens 122. A gasket 124 is compressed between each bushing 120 and the side wall 26 of the housing 10. The housing 10 is provided with threaded apertures opposite the lenses 122, these apertures being normally closed by plugs 126. It will be obvious that, by removing the plugs 126, the three lenses may readily be focused upon the object to be photographed.

The view finder comprises a usual hinged frame 128, having a scored lens 130 mounted therein. A spring 132 holds the frame 128 in either its operative or inoperative position, in a well known manner. A peep-sight aperture 134 is formed in the end of a rod 136, which is slidably mounted in a bushing 138 secured in the cover 12. The rod 136 has a longitudinal groove 140 formed therein, said groove being engaged by a pin 142, which is held in its innermost position by a split ring spring 144, the latter surrounding the bushing 138 and pressing the pin 142 inwardly with force sufficient, frictionally, to maintain the rod 136 in any position of adjustment. The rod is, of course, suitably graduated in measures of distance, and may thus readily be adjusted so that the view observable through the peephole 134 and the lens 130 will correspond to that of the field of the camera. A tubular cap 146 is secured over the bushing 138 and prevents the admission of light to the interior of the camera.

*The shutter mechanism*

The plate 20 is suitably grooved longitudinally to receive a cocking slide 148, which is channel-shaped in cross section. A shutter 150 is slidable within the trough of the channeled slide 148, relative sliding movement between the slide 148 and the shutter 150 being limited by the engagement of a pin 152, which projects into a slot 154 formed in the shutter. The slide 148 has a sidewardly extending portion 156. A pin 158 is secured to this portion 156 and projects outwardly through a slot 160 formed in the front plate 20. The slide 148 is normally held in its uppermost position by a tension coil spring 162 (Fig. 14). The shutter 150 is provided with three circular apertures 164, and the slide 148 is provided with similar apertures 166. The shutter 150 has a lug 168 struck outwardly therefrom to serve as an anchorage for the end of a fine cord 170, the opposite end of which is secured to a pulley 172, which is rigidly secured to a shaft 174. The shaft 174 has an end portion 176 journaled in a bearing 178, which is secured to the plate 20 by means of screws 180. A torsion coil spring 182 has one end anchored in the bearing 178 and its other end secured to the pulley 172. The pulley is thus normally urged in the direction of the arrow (Fig. 16), so as to pull the shutter 150 upwardly.

The speed with which the spring 182 will act to draw the shutter upwardly is controlled in the following manner: The shaft 174 has a bevel gear 184 secured thereto, said bevel gear meshing with a bevel pinion 186 secured to a shaft 188. The shaft 188 is carried in bearing cups 190 threaded in the casting 20. A spur gear 192, secured to the lower end of the shaft 186, meshes with a spur pinion 194 secured to a spindle or shaft 196, which is mounted in a manner similar to that of shaft 186. The spindle 196 has a fly wheel or friction wheel 198 rigidly secured thereto. This wheel is adapted to be engaged by a friction pad 200, carried by a resilient arm 202. The arm 202 has one end rigidly secured to the casting 20, and at its other end has sidewardly and inwardly extending lugs 204.

Adjustment of the degree of friction between the pad 200 and the wheel 198 is obtained in the following manner: A manually engageable knob 206 has a stem 208 journaled in a bearing bushing 210. A peripherally notched disc 212 is pinned to the inner end of the stem 208 and carries a plurality of adjustable screws 214, which fit tightly in their threaded holes. A removable plug 216 is threaded in the casting 20 adjacent the flange of the knob 206, so that, by the removal thereof, a screw-driver may be inserted to permit adjustment of the screws 214. The spaced peripheral notches formed in the disc 212 are adapted to be engaged by a bent spring detent 218, so that the disc will be held in any position of the adjustment. It will be understood that the screws 214 will normally be adjusted so as to project inwardly (to the right, Fig. 16) from the disc 150

212, different distances, so that merely by rotation of the knob 206 different degrees of tension may be placed upon the spring arm 202 and thereby press the pad 200 against the wheel 198 with different degrees of pressure. The frictional retarding effect of the pad 200 may thus be varied so that the shutter will be moved upwardly at different speeds by means of the spring 182.

To condition the shutter for operation, it is necessary, first, to pull downwardly to the position in which these parts are shown in Fig. 9. During this downward movement, the apertures in the slide and in the shutter will not be in registry, and no light will pass to the film. After moving the slide to its lowermost position, it is released and moves upwardly. The shutter 150 is, however, retained in its lowermost position by means of a shutter releasing dog 220, which is mounted for sliding movement in a groove 222 formed in the plate casting 20. The dog 220 has a short upwardly extending stud 224 adjacent the mid portion thereof, this lug normally projecting into an elongated slot 226 (Fig. 15) formed in one end of a T-shaped lever 228 which is pivoted at 230 within a recess formed in the front plate casting 18. In Fig. 14, the T-shaped lever 228 is shown superimposed upon the remaining parts of said figure, being illustrated in dotted lines. It will be understood, however, that the lever is pivotally connected to the casting plate 18, but that when the parts are assembled the lever will lie in the position shown in Fig. 14. A spring 234 has one end anchored to the plate 18 by a pin 236 and its other end secured to an arm 238 of the T-shaped lever 228. The downwardly extending arm 240 of the lever 228 has an outwardly (Fig. 15) projecting pin 242 secured thereto and an inwardly projecting pin 244 adjacent its lower extremity. The pin 244 is normally positioned directly in front of a drilled hole 246, through which an actuating Bowden wire 248 projects. This wire is encased in the usual flexible tube 250 and at its outer extremity has the usual depressible thumb piece.

The pin 242, when the parts are in properly assembled relation, projects within an annular groove 252 formed in a sleeve 254 (Fig. 12). The sleeve 254 is freely slidable and rotatable in a bore 256 formed in the plate casting 20, and has a pair of elongated longitudinal slots 258 formed therein. A plunger 260, having a head 262, is mounted for sliding movement within the sleeve 254. A cross pin 264 is secured in the head 262 of the plunger, its ends projecting into the slots 258 of the sleeve so as to form a lost motion connection between the plunger and sleeve. The plunger is normally held in its innermost position by means of a coil spring 266 compressed between the head 262 and a plate 268 secured to the plate casting 20, and in which the plunger 260 is guided. The plunger carries a thumb piece 270 at its outer extremity, said thumb piece having a pair of notches 272 and 274 alternately engageable with a pin 276 rigidly secured in the plate 268. The inner end of the sleeve 254 has a semi-cylindrical extension 278 which is adapted to form a stop for the shutter 150. The shutter has a notch 280 formed therein, a saw-tooth projection 282 formed adjacent said notch, and a shoulder 284 spaced below said projection.

An exposure counter 286 is secured within a suitable recess formed in the front plate 20, and has an actuating arm 288 which projects into the path of the slide 148, being received by a slot 290 in the lower end of said slide and being actuated by said slide adjacent the lower end of the stroke of the latter.

The intermediate plate 18 has inwardly projecting flanges 292 (Fig. 4), having three circular bores 293. The color filters 294 are secured within the bores 293 by means of a plate 296 which is secured to the inwardly projecting flange 292, being pressed thereagainst by means of a tubular shell 298, the latter being slidable in the bore and being resiliently held against the screen 294 by a resilient washer 300. In the preferred embodiment of my invention, these color filters are red, green and blue.

Operation

In using the camera of my invention, the cover 12 may readily be removed from the housing 10 and the film inserted in the usual manner. During this operation, the presser plate 292 may readily be pulled away from the corresponding guide 90 by pressing inwardly on the finger piece 106 and moving the slide 96 to the right (Fig. 5). After the film has been properly inserted, the cover may be replaced and the operation of taking pictures commenced. When taking a picture, the pin 158 is first pulled downwardly, whereupon the slide 148 and shutter 150 will move downwardly as a unit, due to the inter-engagement of the pin 152 on the slide with the lower end of the slot 154 formed in the shutter. When the slide and shutter have been moved to the lowermost position, as generally indicated in Fig. 9, the dog 220 will, due to the action of the spring 234 acting through the T-shaped lever 228, be snapped over the saw-tooth projection 282. Upon releasing the pin 158, the slide 148 will be drawn upwardly by spring 162 until upward movement is arrested by the engagement of pin 158 with the upper end of its slot 160.

Assuming that the sleeve 254 has been set so that its end projection 278 does not interfere with upward sliding movement of the shutter 150, the film may be exposed by operation of the usual shutter release wire. This wire 248 causes a counter-clockwise (Fig. 15) movement of the T-shaped lever 228. This pivotal movement (clockwise, Fig. 9) causes the dog 220 to be slid away from its position above the saw-tooth projection 282, thereby releasing the shutter. As the shutter is pulled upwardly, under the influence of the coiled torsion spring 182, the apertures 164 thereof will for a time overlie the corresponding apertures 166 formed in the slide 148, which latter, when in normal position, are in registry with the lens apertures. The length of exposure will, of course, depend upon the speed with which the shutter 150 is pulled upwardly.

As previously stated, the speed of the upward movement of the shutter may be regulated by adjustment of the positions of the set screws 214. Access to these set screws 214 is readily obtained by the removal of the screw plug 216. It will be noted that the thumb piece 206 may be rotated so as to bring any desired set screw into engagement with the spring arm 202 and thereby vary the force with which the friction pad 200 is pressed against the friction wheel 198. As indicated in Fig. 5, the flange of the thumb piece 206 has indicia in fractional parts of a second to indicate the speed for which the shutter mechanism is set. The tension of the spring 182 may readily be adjusted by removing the screws 180 and rotating the bearing plate 178 in the direction necessary to increase or decrease the tension, as may be desired.

When it is desired to take a time exposure, the sleeve 254 is rotated so that the flat surface of the semi-cylindrical projection 278 thereof will be capable of being projected into a position to engage the shoulder 284 of the shutter 150 and arrest upward movement of the same. When the shutter is released with the sleeve set in this position, clockwise (Fig. 11) pivotal movement of the T-shaped lever 228 will cause the dog 220 to be disengaged from above the projection 282 and at the same time cause the projecting end portion 278 of the sleeve to be moved into the path of the shoulder 284. When the slide is thus arrested by engagement of the shoulder 284 with the flat surface of the semi-cylindrical end projection 278 of the sleeve 254, the apertures in the shutter will be in alignment with the lens apertures and the apertures in the slide, and the film thus exposed. Upon releasing the pressure on the Bowden wire shutter release actuator, the spring 234 will swing the T-shaped lever 228 clockwise, as shown in Fig. 11, to withdraw the projection 278 from above the shoulder 284. Thereupon, the slide will be moved upwardly a further distance until it is again arrested by the engagement of the lower end of the slot 154 in the shutter 150, with the pin 152 carried by the slide 148. At this time, the dog 220 will also have been moved to the position in which it is shown in Fig. 14, directly overlying the shoulder 284.

It will be understood that at each exposure the three separated portions of the film will be exposed, and the exposure upon each portion of the film will be substantially identical with that of the other portions. While the pictures on the various portions of the film will be substantially identical in outline, the degree with which the emulsion on the various portions of the film will be affected will depend upon the color of the objects in the field of view of the camera, due to the use of filters of different colors. Thus, by utilizing a projector having means for simultaneously projecting the three exposed portions of the film through color screens corresponding to the colored filters in the camera, the picture projected will appear in substantially its natural colors, in the manner well known in the art.

In my co-pending application, Serial No. 607,292, filed April 28, 1932, I have disclosed and claimed a projector suitable for use in the projection of the pictures from films exposed by means of the camera herein described.

While the three exposures are made upon spaced portions of the film, the intermediate portions are utilized in making other exposures. For example, by considering the portions as being numbered consecutively, the first exposure may be made upon portions numbered 1, 3 and 5, the second exposure on portions numbered 4, 6, 8, the third exposure upon the portions numbered 7, 9, 11 and the fourth exposure on the portions numbered 10, 12 and 14, and so forth. The whole of the film is thus utilized, and there are no intermediate portions wasted.

While I have shown and described a particular embodiment of my invention, it will be apparent to those skilled in the art that various modifications in design and construction may be made without departing from the spirit of my invention.

What I claim as new and desire to secure by Letters Patent of the United States is:

1. In a camera for the simultaneous taking of a plurality of records, the combination of a plurality of lenses, film carrier and film feeding means for positioning a film in the focal plane of said lenses, a reciprocable slide movable between said lenses and focal plane and having a plurality of apertures formed therein, a shutter having a lost motion connection with said slide, positioned in close proximity thereto and having openings registrable with the apertures in said slide, means for moving said slide to a position in which said apertures are in alignment with said lenses, means for latching said shutter in a position to mask the apertures of said slide, manually engageable means for releasing said latching means, and means for governing the speed of movement of said shutter.

2. In a camera for the simultaneous taking of a plurality of records, the combination of a plurality of lenses, film carrier and film feeding means for positioning a film in the focal plane of said lenses, a reciprocable slide movable between said lenses and focal plane and having a plurality of apertures formed therein, a shutter having a lost motion connection with said slide, positioned in close proximity thereto and having openings registrable with the apertures in said slide, means for moving said slide to a position in which said apertures are in alignment with said lenses, means for latching said shutter in a position to mask the apertures of said slide, manually engageable means for releasing said latching means, and means for governing the speed of movement of said shutter, said means comprising a friction wheel rotated at high speed incident to the movement of said shutter, a friction pad engageable with said wheel, a resilient member for pressing said friction pad against said wheel, and means for varying the tension of said resilient member.

3. In a camera for the simultaneous taking of a plurality of records, the combination of a plurality of lenses, film carrier and film feeding means for positioning a film in the focal plane of said lenses, a reciprocable slide movable between said lenses and focal plane and having a plurality of apertures formed therein, a shutter having a lost motion connection with said slide, positioned in close proximity thereto and having openings registrable with the apertures in said slide, means for moving said slide to a position in which said apertures are in alignment with said lenses, means for latching said shutter in a position to mask the apertures of said slide, manually engageable means for releasing said latching means, means for governing the speed of movement of said shutter, and a plurality of individually adjustable elements selectively engageable with said resilient means to vary the tension of the latter.

4. In a camera for the simultaneous taking of a plurality of records, the combination of a plurality of lenses, film carrier and film feeding means for positioning a film in the focal plane of said lenses, a reciprocable slide movable between said lenses and focal plane and having a plurality of apertures formed therein, a shutter having a lost motion connection with said slide, positioned in close proximity thereto and having openings registrable with the apertures in said slide, means for moving said slide to a position in which said apertures are in alignment with said lenses, means for latching said shutter in a position to mask the apertures of said slide, manually engageable means for releasing said latching means, and means for governing the speed of movement of said shutter, said means comprising a torsion spring, a pulley driven thereby, a driving connection between said pulley and said shutter, and adjustable friction means to exert a variable drag upon said pulley.

5. In a camera for the simultaneous taking of a plurality of records, the combination of a plurality of lenses, film carrier and film feeding means for positioning a film in the focal plane of said lenses, a reciprocable slide movable between said lenses and focal plane and having a plurality of apertures formed therein, a shutter having a lost motion connection with said slide, positioned in close proximity thereto and having openings registrable with the apertures in said slide, means for moving said slide to a position in which said apertures are in alignment with said lenses, means for latching said shutter in a position to mask the apertures of said slide, manually engageable means for releasing said latching means, and means for governing the speed of movement of said shutter, said means comprising a spring for moving said shutter, a speed increasing gearing connected to said spring and driven thereby upon release of said shutter, a friction wheel driven by said gearing, and an adjustable tension spring-pressed element engageable with said friction wheel to selectively apply a predetermined frictional drag to said wheel, thereby to control the speed of operation of said shutter.

6. In a camera for the simultaneous taking of a plurality of records upon a film, the combination of a plurality of lenses, film carrier and film feeding means for positioning a film in the focal plane of said lenses, a slide reciprocable between said lenses and said focal plane and having apertures in alignment with said lenses, a spring to move said slide in one direction, a shutter reciprocable relative to said slide and having openings adapted for registry with the apertures therein, a pin and slot connection between said shutter and said slide, resilient means for moving said shutter in the same direction that said shutter is resiliently actuated, manually releasable means for latching said slide in the position in which said resilient means are under increased tension, and manually engageable means for moving said slide against the tension of its spring and through said lost motion connection moving said shutter against the tension of its associated resilient means to a position in which said latching means is operative.

7. In a camera for the simultaneous taking of a plurality of records, the combination of a plurality of lenses, film carrier and film feeding means for positioning a film in the focal plane of said lenses, a shutter for simultaneously permitting the transmission of light from said lenses to said focal plane, color filters of different colors interposed between said lenses and said focal plane, a plurality of mirrors positioned at an angle of 45 degrees relative to said focal plane and behind the latter and in alignment with said lenses, a plurality of lens apertures one adjacent each of said mirrors through which the latter may be observed, and means to close said apertures.

8. In a camera for the simultaneous taking of a plurality of records upon a film, the combination of film carrier and film feeding means for positioning a film in the focal plane of said lenses, a slide reciprocal between said lenses and focal plane and having apertures adapted for alignment with said lenses, a tension spring normally holding said side with its apertures in alignment with said lenses, said spring yieldable to permit movement of the slide in one direction and adapted to retract the slide to said aligned position of its apertures, a shutter reciprocable relative to said slide and having openings adapted to register with said apertures, resilient means yieldable to permit movement of the shutter in directions corresponding to said movement and retraction of the slide, a pin and slot connection between said shoulder and slide, manually engageable means for moving said slide against the tension of its spring and through said pin and slot connection moving the shutter against the tension of its associated resilient means, and manually releasable means for latching said shutter in partially retracted position with its openings in register with said apertures and in alignment with said lenses.

CHARLES L. FITZ.